(12) United States Patent
Varma et al.

(10) Patent No.: US 6,275,497 B1
(45) Date of Patent: *Aug. 14, 2001

(54) METHOD AND APPARATUS FOR CONTROLLING COMMUNICATION CHANNELS USING CONTENTION AND POLLING SCHEMES

(75) Inventors: Subir Varma, San Jose; Frederick Enns, Menlo Park, both of CA (US)

(73) Assignee: Hybrid Networks, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,735

(22) Filed: Aug. 27, 1997

Related U.S. Application Data

(60) Provisional application No. 60/039,970, filed on Feb. 10, 1997.

(51) Int. Cl.[7] .................................................. H04L 12/28

(52) U.S. Cl. ........................................... 370/431; 370/421

(58) Field of Search ..................................... 370/431, 443, 370/444, 445, 447, 449, 450, 455, 459, 461, 462, 333, 463, 487, 346, 347, 348, 451, 322, 270, 420, 421, 423, 424, 432, 433, 460; 340/825.08, 825.5, 825.51, 825.52

(56) References Cited

U.S. PATENT DOCUMENTS 4,667,193   5/1987   Cotie et al. .
4,754,426   6/1988   Rast et al. .

(List continued on next page.)

OTHER PUBLICATIONS

Ramon Caceres et al., "Characteristics Of Wide–Area TCP/IP Conversations", Comp. Science Dept., Univ. of South. Cal,9/1991, pp. 101–112.

(List continued on next page.)

*Primary Examiner*—Dang Ton
*Assistant Examiner*—Phirin Sam
(74) *Attorney, Agent, or Firm*—McIntyre Harbin & King

(57) ABSTRACT

A medium access controller for a multi-user network that assigns or changes the operating protocol of multiple upstream channels according to user loading, user status, and/or type of payload data transfers requested by the user or detected by the controller. One group of upstream channels utilizes a contention-only protocol for non-responding or off-line users, a second group utilizes a limited type polling protocol for users requiring only brief transfers of payload data, and a third group utilizes an exhaustive polling protocol user requiring large amounts of payload data transfers. Limited type polling provides low latency for quick response to accommodate multiple users, while exhaustive polling provides large data throughput at the expense of latency. Additional levels of limited or exhaustive polling may be employed to accommodate a larger variety of users needs. In addition, the channels themselves may be dynamically reclassified between and among contention and first and/or other level polling modes based on user loading and/or the nature and character of on-going data transfers in order to achieve maximum utilization of shared resources. After initiating a data transmission, the controller may also dynamically assign channels to a user based on detected changes in actual data transmissions. Thus, rules based on user activity level may be implemented to determine when a user is switched between channel groups. Essentially, the controller may effect switching of the users' upstream channels dynamically and intelligently on a packet-by-packet basis. Users may include modems and/or other terminal devices in a client-server or other data communication network.

28 Claims, 15 Drawing Sheets

U.S. PATENT DOCUMENTS

| | | |
|---|---|---|
| 4,829,297 | 5/1989 | Ilg et al. . |
| 4,887,265 * | 12/1989 | Felix ................................. 370/333 |
| 4,928,177 | 5/1990 | Martinez . |
| 5,012,469 * | 4/1991 | Sardana ............................. 370/447 |
| 5,070,536 | 12/1991 | Mahany et al. . |
| 5,130,983 * | 7/1992 | Heffner, III ....................... 370/449 |
| 5,347,515 | 9/1994 | Marino . |
| 5,355,375 | 10/1994 | Christensen . |
| 5,361,091 * | 11/1994 | Hoarty et al. ........................ 348/7 |
| 5,430,732 | 7/1995 | Lee et al. . |
| 5,483,676 | 1/1996 | Mahany et al. . |
| 5,534,941 | 7/1996 | Sie et al. . |
| 5,563,883 * | 10/1996 | Cheng ............................... 370/462 |
| 5,572,517 * | 11/1996 | Safadi ............................... 370/449 |
| 5,577,046 | 11/1996 | Diachina et al. . |
| 5,586,121 * | 12/1996 | Moura et al. ..................... 370/463 |
| 5,615,212 * | 3/1997 | Ruszczyk et al. ................. 370/433 |
| 5,648,958 * | 7/1997 | Counterman ..................... 370/458 |
| 5,651,009 * | 7/1997 | Perreault et al. .................. 370/447 |
| 5,673,252 * | 9/1997 | Johnson et al. ................... 370/449 |
| 5,684,802 * | 11/1997 | Perreault et al. .................. 370/449 |
| 5,719,872 * | 2/1998 | Dubberly et al. ................. 370/487 |
| 5,793,307 * | 8/1998 | Perreault et al. .................. 370/451 |
| 5,805,586 * | 9/1998 | Perreault et al. .................. 370/346 |
| 5,909,444 * | 6/1999 | Lee et al. ......................... 370/462 |
| 5,926,476 * | 7/1999 | Ghaibeh ........................... 370/395 |
| 5,953,348 * | 9/1999 | Barn ................................. 370/480 |
| 5,956,338 * | 9/1999 | Ghaibeh ........................... 370/395 |
| 6,002,680 * | 12/1999 | Sierens et al. .................... 370/344 |
| 6,006,017 * | 12/1999 | Joshi et al. ....................... 370/449 |

OTHER PUBLICATIONS

Vern Paxson et al., "Wide–Area Traffic: The Failure Of Poisson Modeling", Lawrence Berkeley Lab, 6/1995, pp. 1–18.

Serner Bux et al., "Mean–Delay Approximation For Cyclic-Service Queueing Systems", IEEE, 1983, pp. 187–196.

Onno J. Boxma et al., "Waiting–Time Approximations For Cyclic–Service Systems With Switchover Times", IEEE, 1986, p. 299–308.

Hideaki Takagi, "Analysis Of Polling Systems" (1986).

* cited by examiner (CONTROLLER STATE MACHINE)

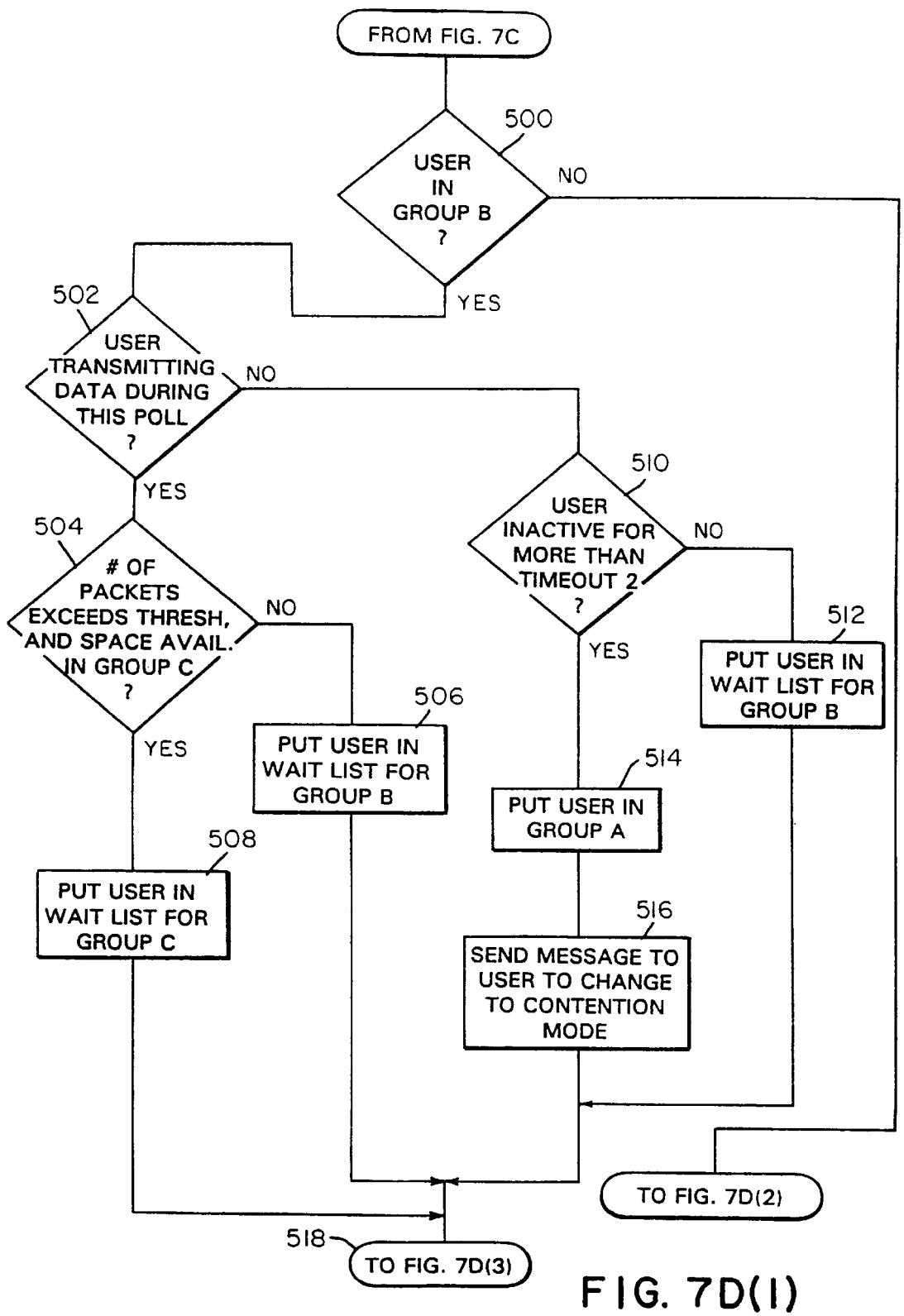
FIG. 7D(1)

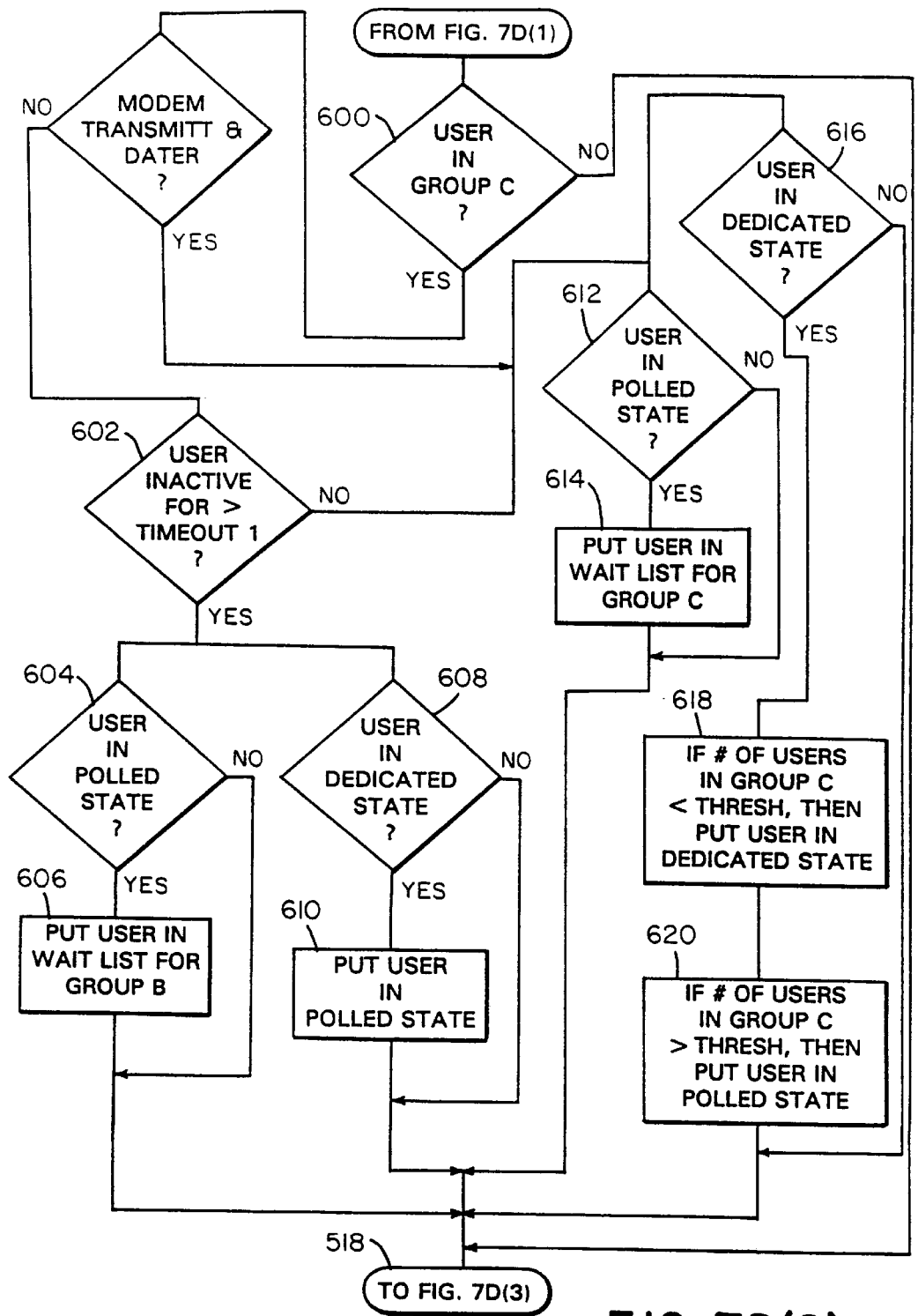
FIG. 7D(2)

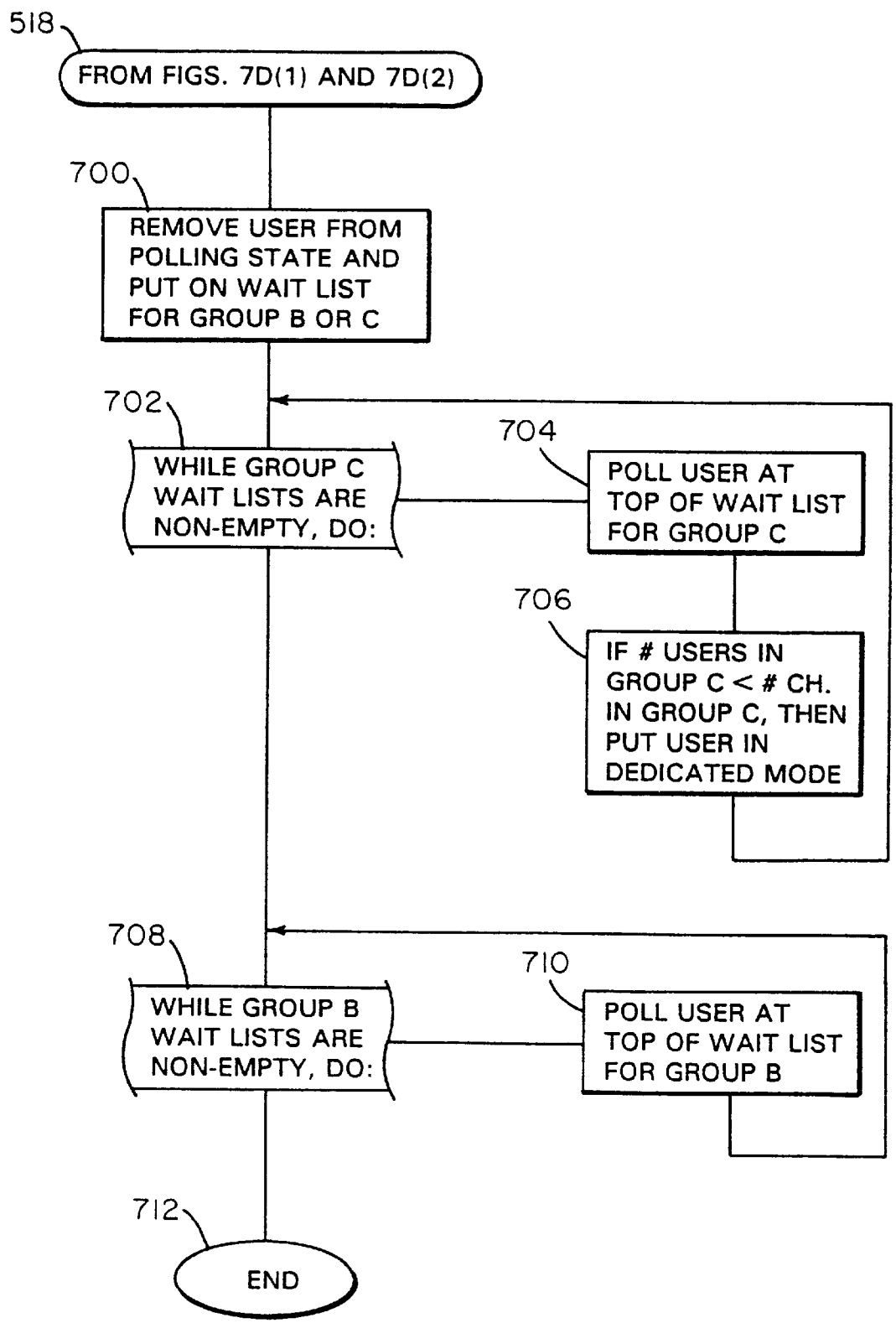
FIG. 7D(3)

METHOD AND APPARATUS FOR CONTROLLING COMMUNICATION CHANNELS USING CONTENTION AND POLLING SCHEMES

CROSS-REFERENCE TO RELATED APPLICATION

This application claims the benefit of Provisional Application Serial No. 60/039,970 entitled Network Channel Sharing Method, which was filed on Feb. 10, 1997 in the name of the same inventors hereof.

BACKGROUND OF THE INVENTION

1. Field of the Invention

This invention relates to a method and system for of sub-channelizing a broadband medium and assigning pre-defined protocols to respective subchannels thereof. More particularly, it relates to a method and system for sharing sub-channels based on the nature of the data to be transferred in a multi-channel communication network.

2. Background of Related Art

The general trend of the prior art has been to establish high bandwidth channels for the transmission of data to improve performance. For instance, recent improvements in dial-up modems has been the migration from 28.8 Kb/s to 56 Kb/s. It is conventionally assumed that larger bandwidths provide better performance. In the case of shared channels, as the bandwidth of channels increases, so does the complexity of the channel, including the protocol used. Moreover, larger bandwidths increase the possibility that noise at a particular frequency will erode the reliability of communications.

In a shared channel environment, media access protocols involve contention or polling to gain channel access. For instance, U.S. Pat. No. 5,563,883 discloses a controller which periodically broadcasts a polling message simultaneously to a plurality of cable modems over a shared downstream communication channel. The cable modems then contend for access to a single upstream channel. If messages of more than one modem collide with one another, a binary search method implemented in a media access controller arbitrates between and isolates colliding modems. However, only one upstream channel is available for the colliding modems to communicate upstream back to the controller. Thus, all modems assigned to a particular upstream channel must not only contend for channel access to respond to the downstream broadcast poll, but any subsequent data transmission must also contend for the same single upstream channel. This leads to congestion and lower performance.

U.S. Pat. No. 4,829,297 discloses a communication method wherein the same polling technique is used in two channels. While this increases performance only because it provides two upstream paths rather than just one, it fails to segregate busy users from inactive or idle users.

U.S. Pat. No. 4,754,426 teaches the prioritized polling technique of placing a higher priority on some users, and thus polling those higher priority users more frequently. However, all upstream communications remain on a single channel. Thus, the performance of the higher priority users is increased, but at the expense of the non-high priority users.

Other patents such as U.S. Pat. No. 5,572,517 to Safadi discourage the use of a polling scheme in a shared network environment altogether.

SUMMARY OF THE INVENTION

The present invention exploits the beneficial aspects of both contention and polling protocols by employing dynamic allocation of upstream channels to move users of a network between diverse channels utilizing different protocols selected to maximize data transfer based on the instantaneous transmission status of the user and/or a user's detected or requested payload data transfer needs.

For instance, non-responding users (e.g., user equipment that is powered down) are assigned to a first group of channels utilizing a contention-only protocol in the upstream direction. After detection by a media access controller, the status of responding and active users are reclassified to use a second group of channels utilizing a polling protocol that is maximized for low latency, e.g., a limited-1 polling scheme. Users demanding heavy usage with lengthy transmissions reclassified to use a third group of upstream channels, called burst channels, that are maximized for high throughput, e.g., channels that have an exhaustive polling or approximately exhaustive polling scheme. The media access controller is capable of switching the users' upstream channels dynamically and intelligently on a packet-by-packet basis. Rules based on payload data activity level of the user are implemented to determine when the user is to switch between channel groups. The user can transmit on any of a plurality of upstream channels or sub-channels, utilizing either a contention-based protocol, or any of a plurality of polling-based protocols, on a per-packet basis.

Contention based algorithms work well when there are a large number of subscribers but only a few of them are active at any time (i.e. in light traffic), while polling based algorithms work well in heavy traffic. The present invention utilizes the efficiencies of both protocols. First, by initially assigning non-responding users (e.g. powered-down users) to a channel chosen at random out of the group of contention mode channels. Once it becomes active, the user is moved to a first level polling mode channel selected from a first group of polling mode channels operating with a polling protocol that is maximized for low is latency. Then, as necessary, the user is moved again to a higher level polling mode channel selected from a second group of polling mode channels operating with a polling protocol that is maximized for maximum throughput, the burst mode channel. Additional levels of polling mode channel groups blending a mix of low latency and maximum throughput, e.g., greater than limited-1 type polling, although adding to the complexity of the overall protocol, can add further efficiencies to the communication system. In another aspect of the invention, the communication mode of the channel itself may dynamically be changed, e.g., between polling and contention modes, based on user loading.

Ranging and synchronization between the media access controller and the users are not necessary according to the present invention because of the use of contention mode and polling mode channels.

Moreover, the present invention makes intelligent use of an expanded number of smaller bandwidth channels formed from a smaller number of larger bandwidth channels. It is found that there is a greater likelihood of having a larger number of usable smaller bandwidth upstream channels than there is of having an equivalent amount of usable larger bandwidth upstream channels due largely to the noise characteristics in the upstream path of a cable TV facility. Commonly assigned U.S. patent application Ser. Nos. 08/702,932 and 08/735,110 disclose the sub-channelization of a communication channel and are explicitly incorporated herein by reference.

In view of the foregoing, it is an object of the present invention to maximize the throughput and reliability of a plurality of upstream channels from a plurality of users to a host computer or controller.

It is a further object of the present invention to intelligently pass packet data from a single user to a host computer or controller over a selected one of a plurality of upstream channels operating with different protocols chosen based on the data itself.

It is also an object of the present invention to maximize the performance of an overall polling scheme by providing classifying a plurality of sub-channels into a plurality of groups, each group utilizing a different polling scheme.

It is a further object to provide a protocol which switches upstream communications between different polling mode channel groups based on optimized performance criteria.

This summary is not intended to limit the invention to any extent beyond that defined in the appended claims.

BRIEF DESCRIPTION OF THE DRAWINGS

These and other objects of the invention will be understood by persons of ordinary skill in the art after review of this specification and with reference to the drawings, in which:

FIGS. 7A to 7D(3) are flow charts showing procedures implemented at various states of the controller state machine in the exemplary embodiment of the present invention;

DESCRIPTION OF ILLUSTRATIVE EMBODIMENTS

Figure 1:
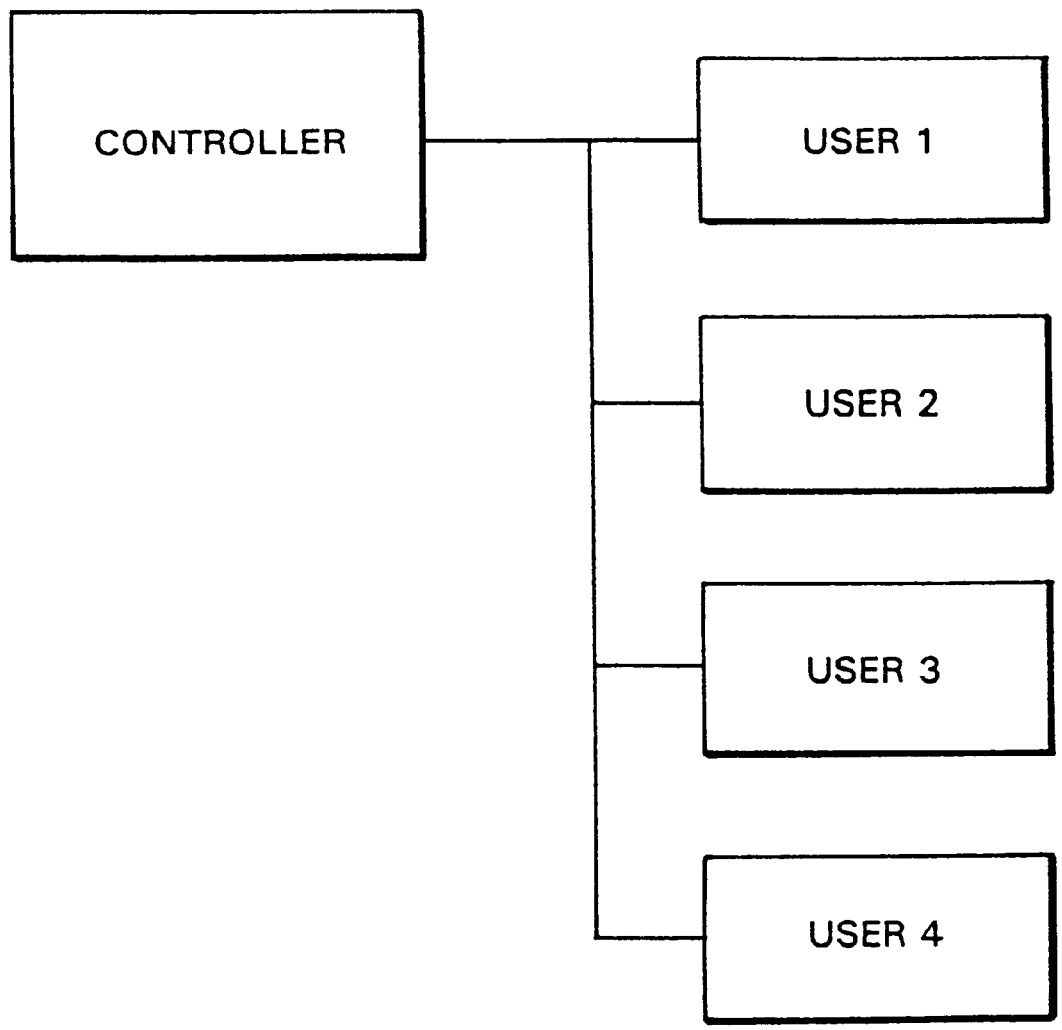
FIG. 1 shows a network including a controller (e.g., a TV facility head end) and a plurality of users (e.g., cable modems)

FIG. 1 shows a network including a host computer or controller 100 and a plurality of users 101–104 according to the present invention. The network may encompass virtually any medium, wired or wireless. The host computer or controller 100 may be, as in the exemplary embodiment, a TV facility head end, and the users 101–104 may be cable modems installed in subscribers homes.

Figure 2:
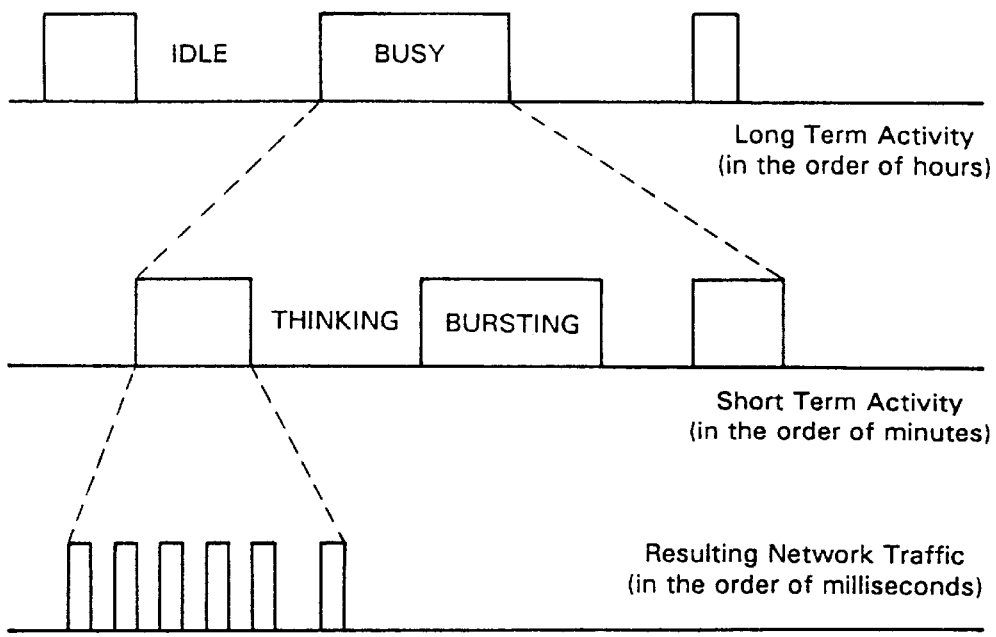
FIG. 2 shows a user activity model for FTP and WWW type applications requiring high throughput for optimized performance.
Figure 3:
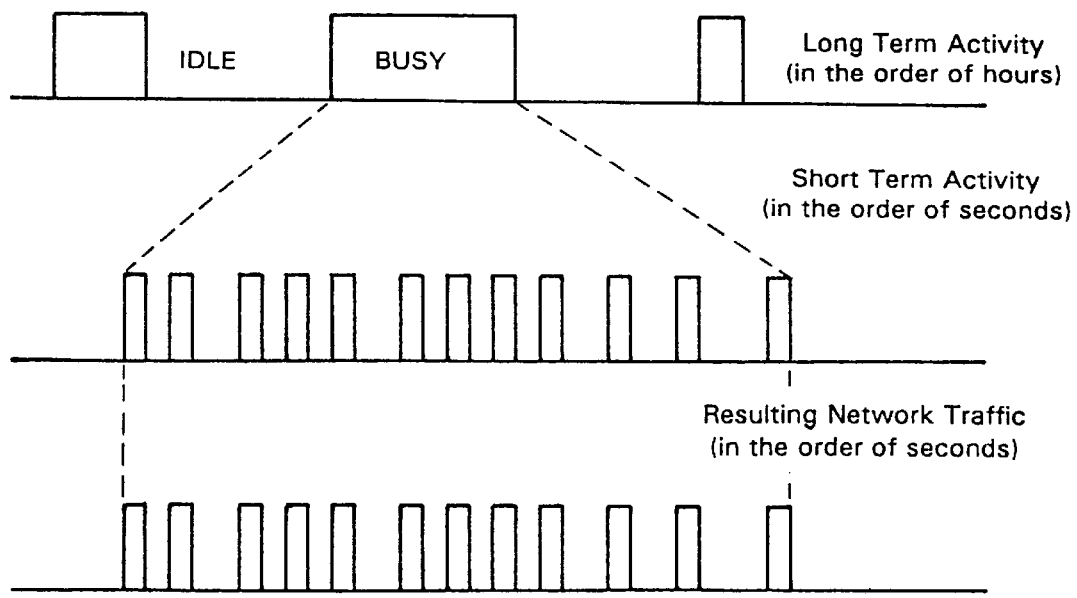
FIG. 3 shows a user activity model for Telnet and Rlogin type applications requiring low latency for optimized performance.

FIG. 2 shows Type I file transfer applications such as FTP, WWW, SMTP and NNTP, and FIG. 3 shows Type II file transfer applications such as Telnet and Rlogin.

When users operating Type I applications are busy communicating, they cycle through alternate periods of bursting and processing. The sizes of the bursts are typically on the order of several thousand bytes of data. For maximum throughput and performance, Type I applications should conclude their bursts as quickly as possible.

When users operating Type II applications are busy, they generate relatively small packets on the order of a few bytes each, but on a more continuous basis as compared to Type I applications. For example, for Telnet and Rlogin applications, a packet of only byte is generated each time the user types a character on his terminal, and is displayed only after it has been echoed back by the receiver. Type II applications are desirous of viewing typed characters as quickly as possible, and thus round trip latency must be minimized.

There is a conflicting interest between the needs of Type I applications and the needs of Type II applications. The performance for Type I applications is optimized only at the expense of performance for Type II applications. Thus, conventional systems utilizing a single channel and a single protocol, i.e., contention or polling, balance the needs of Type I applications against the needs of Type II applications. The present invention does not balance the needs of Type I applications against the needs of Type II applications. Instead, it optimizes both the needs of Type I applications and the needs of Type II applications by providing separate communication channels for each type application. The present invention satisfies both the need for high throughput by Type I applications and the need for low latency by Type II applications by allowing each user to communicate with the controller via distinct channels or sub-channels operating with different protocols.

Some applications alternate between Type I and Type II during the course of a session. For example, a file transfer using file transfer protocol (FTP) (i.e., Type II application) is typically preceded by several small messages that set up the FTP control connection (i.e., Type I application). As another example, a Telnet user (i.e., Type II user) may be scrolling through several screens of data (i.e., Type I communications). Even though applications alternate between communications which require rapid throughput and those which require low latency, conventional systems typically classify the application as either a Type I application or a Type II application. The present invention classifies applications dynamically as either Type I or Type II based on their current traffic.

In traditional time-division multiple access (TDMA) based medium access channel (MAC) protocols, users transmit a first packet using contention protocols, and subsequent packets by piggybacking on the initial packet.

The protocol of the exemplary embodiment of the present invention differs from contention-only communication protocols in several respects. According to the present invention, each user is provided with access to any one of a plurality of upstream channels or sub-channels operating under different protocols, based on characteristics of the data. Of course, assignment of the users to particular channels may be based on other rules established to provide the users with desired performance.

Initial data is transmitted on one upstream channel in response to a broadcast polling message utilizing a contention protocol in a channel designated for contention mode communications. After the user is detected as active, subsequent data is transmitted utilizing a polling protocol in a polling mode channel. It is desirable to avoid any sustained data transfers in the contention mode channel. It is found that this provides a more deterministic performance for users.

In the exemplary preferred embodiment of the present invention, a head end controller at a cable TV facility (i.e., controller) communicates with a plurality of cable modems in subscribers homes (i.e., users). A plurality of upstream channels are formed within the bandwidth of the communication path between the user and the controller, e.g., a cable. The number of upstream channels from the cable modems to the head end controller is maximized. Sub-channels can be formed from the channels by frequency division or by time division to provide additional communication channels for use by the present invention. The channels and sub-channels can be of equal bandwidth, or can be of differing bandwidth. In the disclosed embodiment, a 6 MHz TV channel is frequency divided into three 2 MHz channels, although the 6 MHz TV channel could instead be divided into only two 3 MHz channels, six 1 MHz channels, or even unequal bandwidth channels such as one 2 MHz channel and four 1 MHz channel. Moreover, a plurality of 6 MHz TV channels are subdivided to provide one common group of communication channels to be used by various contention and polling mode protocols.

In the preferred embodiment, the available upstream channels are classified into particular protocol groups, e.g., Group A, B or C. Group A channels handle communications utilizing a contention protocol and thus operate as contention mode channels. Group B channels handle shorter length 'bursty' communications utilizing a limited type polling protocol and thus operate as limited polling mode channels. Group C channels, interchangeably referred to as burst channels, handle longer length communications utilizing an exhaustive type polling protocol and thus operate as exhaustive polling mode channels.

Given a plurality of available upstream channels, only one upstream channel type need utilize a contention protocol, whereas the remaining channel types can utilize a polling protocol. Alternatively, as many as all but one channel type may utilize a polling protocol. By grouping channels into use for either contention mode or polling mode transmissions, the complexity of the overall protocol is simplified because of the elimination of complex operations such as ranging and synchronization.

According to the exemplary embodiment, the use of a contention mode channel in Group A is restricted to initial communications from the user to the controller common to activation procedures. A newly active user is one which has not transmitted data for a period of time, e.g., within the previous five minutes. Of course, this length of time can vary depending upon the application.

In such a case, the user initially selects one of the available Group A contention mode channels at random, and contends for that channel using a contention protocol. Once the initial contention mode communication is received by the controller, the user's upstream path is reassigned to a limited polling mode channel in Group B. Thus, subsequent data, e.g., subsequent packets, are transmitted on a channel different from that over which the initial contention mode communications occurred.

In the preferred embodiment, the contention mode channels in Group A are not utilized for significant data transfers, but instead for the detection by the controller of the activation of users. Thus, a relatively large number of idle users can be supported on only one or a few contention mode upstream channels without any significant degradation of service.

In assigning users among the polling mode channels, it is not best to allocate all Type I users in one group of channels and all Type II users in the other group of channels. Because of their bursty nature, only a fraction of the total allocated Type I users are actively transferring data at any one time, while the remaining Type I users are in-between bursts. Instead, it is desirable to keep only Type I users which are currently bursting together, while the remaining Type I users can be assigned to share the same group with Type II users. Thus, dynamic allocation of resources is accomplished by the present invention, e.g. between Group B channels and Group C channels. This dramatically reduces the number of users (e.g., cable modems) sharing channels allocated for bursting users, thus increasing performance even more.

An estimate of the number of Type I users which are bursting simultaneously can be calculated as follows from Little's Law.

$$N=(M/R)T$$

Wherein N is the average number of simultaneously bursting users, M is the number of active Type I users in the system, R is the average rate of transactions generated by an active Type I user (once every R seconds), and T is the average time in seconds burst time it takes for a Type I transaction to complete.

For example, if M=100, R=20 seconds, and T=1 second, then Little's Law provides that the average number of simultaneously bursting users is N=5. Thus, out of one hundred Type I users that are busy, it is estimated that statistically only five are bursting at the same time. Thus, it is found that in order to obtain good performance, it is only necessary to provide enough Group C upstream channels from the users (e.g., cable modems) to a controller (e.g., a cable headend) to handle the simultaneously bursting users. In this example, since N=5, it is only necessary to provide enough Group C channels sufficient to handle five simultaneously bursting users at the desired level of performance.

Figure 4:
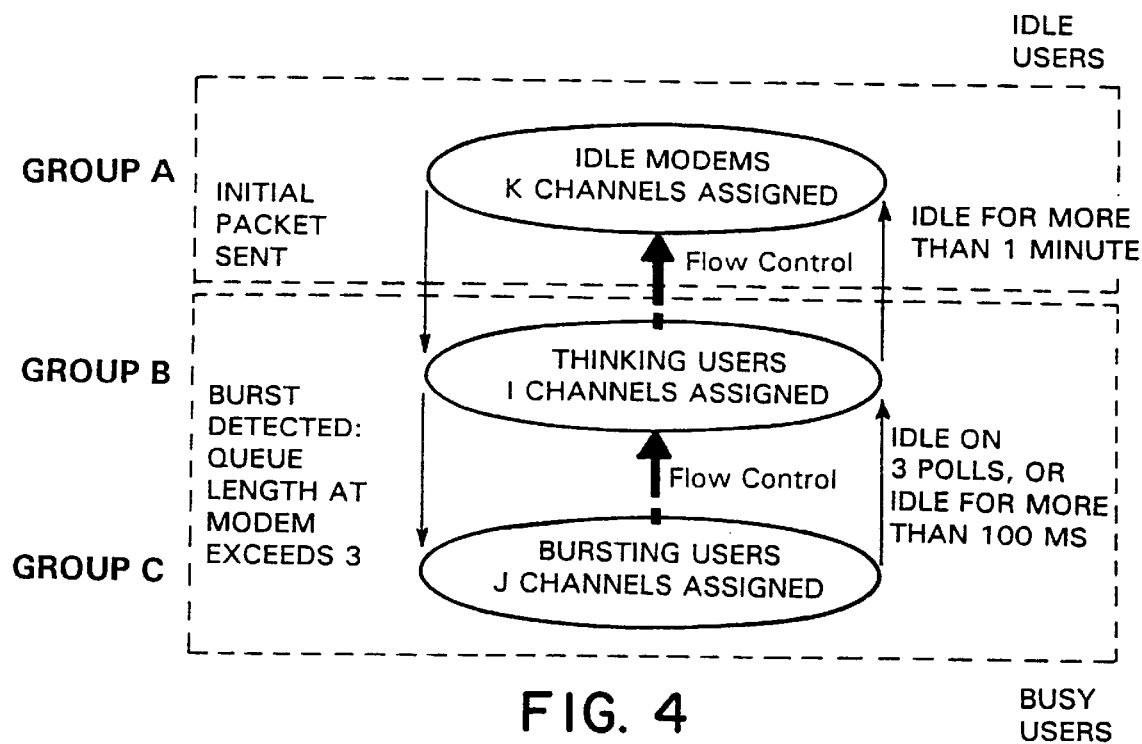
FIG. 4 shows a grouping of available upstream channels into three groups based on an operating protocol.

FIG. 4 shows sub-channel assignment and allocation according to one embodiment of the present invention. K channels are assigned for detecting activity in idle users or cable modems utilizing contention mode protocols, and thus is classified as a Group A contention mode channel. I channels are assigned for polling, non-bursting, but active users or cable modems and thus is classified as a Group B polling mode channel. J channels are assigned for polling bursting modems and thus is classified as a Group C polling mode channel.

Contention Mode Channels—Group A

One contention protocol suitable for use in the contention mode channel of the present invention utilizes a Binary Exponential Back-off based scheme. Simulations have shown that a Binary Exponential Back-off scheme provides adequate performance for a typical number of users (e.g., 1000) in a multiple user communication system, e.g., multiple cable modem subscribers served by a cable TV facility's headend. However, as the number of users utilizing the contention mode channel increases, transmission collisions occur more frequently and thus transmission delays increase and performance decreases. Thus, according the present invention performance is increased by dynamically moving transmissions from users between differently classified upstream channels, preferably on a packet-by-packet basis.

Figure 5:
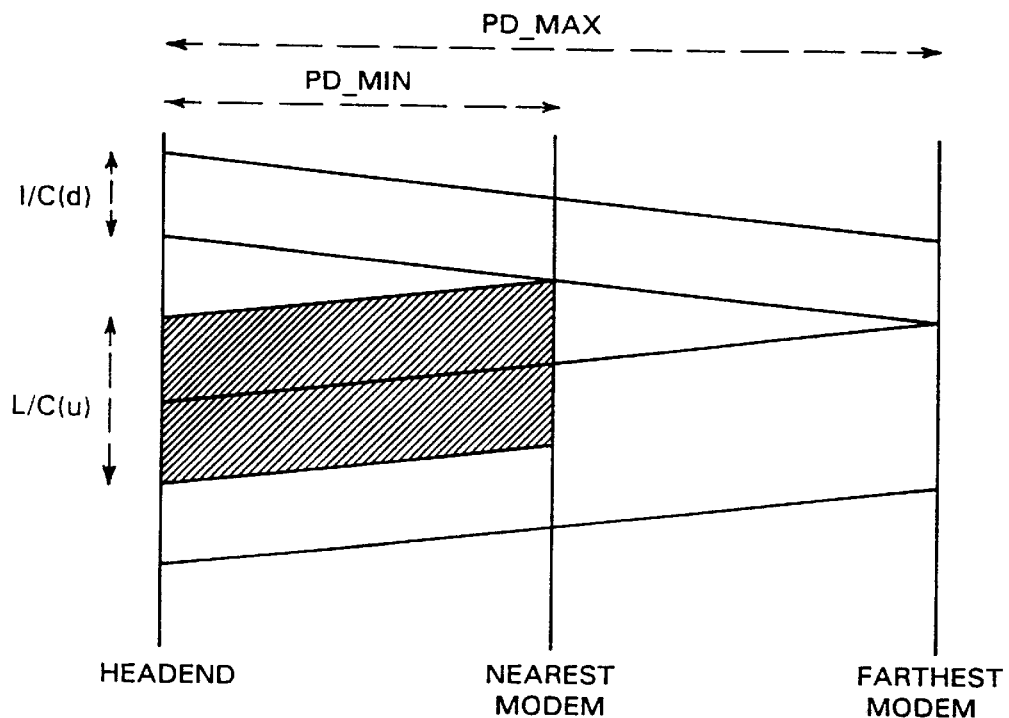
FIG. 5 shows the calculation of delay between a user which is closest to the host computer or controller and a user which is farthest from the host computer or controller.

An important parameter in contention mode channels is the minimum upstream packet size $L_{MIN}$. This value ensures the detection of a collision between multiple users at the controller. FIG. 5 shows the minimum upstream packet size for a contention mode channel.

The last bit from the user or modem nearest to the controller or headend arrives at the controller at a time T1 equal to: $T1 = l/C(d) + L/C(u) + 2PD_{MIN}$, whereas l is the size of the downstream CREDIT packet, L is the size of the upstream data packet, C(d) is the capacity of the downstream link, C(u) is the capacity of the upstream link, $PD_{MIN}$ is the delay from the headend to the nearest modem, and $PD_{MAX}$ is the delay from the headend to the farthest modem.

The first bit from the farthest modem arrives at time T2 equal to:

$$T2 = \frac{l}{C(d)} + 2PD_{MAX}$$

Thus, in order to ensure a collision, it is required that $T1 \geq T2$, which leads to the following condition:

$$\frac{L}{C(u)} \geq 2(PD_{MAX} - PD_{MIN}) \text{ OR}$$

$$L_{MIN} = 2C(u)(PD_{MAX} - PD_{MIN})$$

According to the present invention, a controller (e.g., a headend in a cable TV facility) broadcasts a polling CREDIT message to all users desiring to transmit packet information (e.g. all cable modems). Users that are in the contention mode and have a packet to transmit do so on a contention mode channel when they receive the CREDIT message. U.S. Pat. No. 5,586,121 describes the CREDIT-DONE protocol and is expressly incorporated herein by reference.

If any transmission between a plurality of users collide, then the collision is detected at the controller, and the colliding users are informed of the collision in the next broadcast (polling) CREDIT message sent by the controller in the contention mode channel. Colliding users then undergo a simple binary-exponential back-off, and re-transmit the collided message after a random number of transmit opportunities. If there are multiple upstream contention mode channels available, e.g., Group A channels, then the user chooses one of the multiple upstream contention mode channels at random for each transmission of a packet of data. Hence, if there is more than one contention mode channel, then there are effectively two sources of randomness that help reduce collisions in the contention mode channels: a first due to the existence of a plurality of contention mode channels, and the second due to the binary-exponential back-off scheme.

A user with a packet of data to send monitors the primary contention mode channel for the broadcast poll. Upon detection of the broadcast poll, the user transmits the number of CREDITED packets on a Group A channel chosen at random.

Each user utilizes a simple Ethernet style binary back-off scheme. The controller periodically transmits a broadcast poll message on the downstream contention mode channel, with a period TIME1 equal to the maximum delay for the farthest modem to respond to the poll. In each polling cycle, the controller informs the users about the collision/no collision results from the previous broadcast polling cycle, e.g., by including a COLLISION bit in the CREDIT message. If a collision occurred, the user calculates a back-off window of size $\bar{i}$, where $\bar{i}$ is a random integer in the range $[0, 2^{I-1}]$, and I is the number of collisions which have occurred. The user also calculates $\bar{j} = \min(\max(\bar{i}, 2^{Kmin}), 2^{Kmax})$, and attempts its next transmission after $\bar{j}$ polling cycles by the controller in the contention mode channel. After a predetermined number of successive re-transmissions without success, the packet of data is dropped.

FIG. 5 shows the calculation of delay between a user which is closest to the host computer or controller and a user which is farthest from the host computer or controller. The maximum delay is based on the amount of time necessary to send a poll (e.g., a credit message) to the farthest modem, and to receive a response (e.g., a done message) therefrom.

Figure 6:
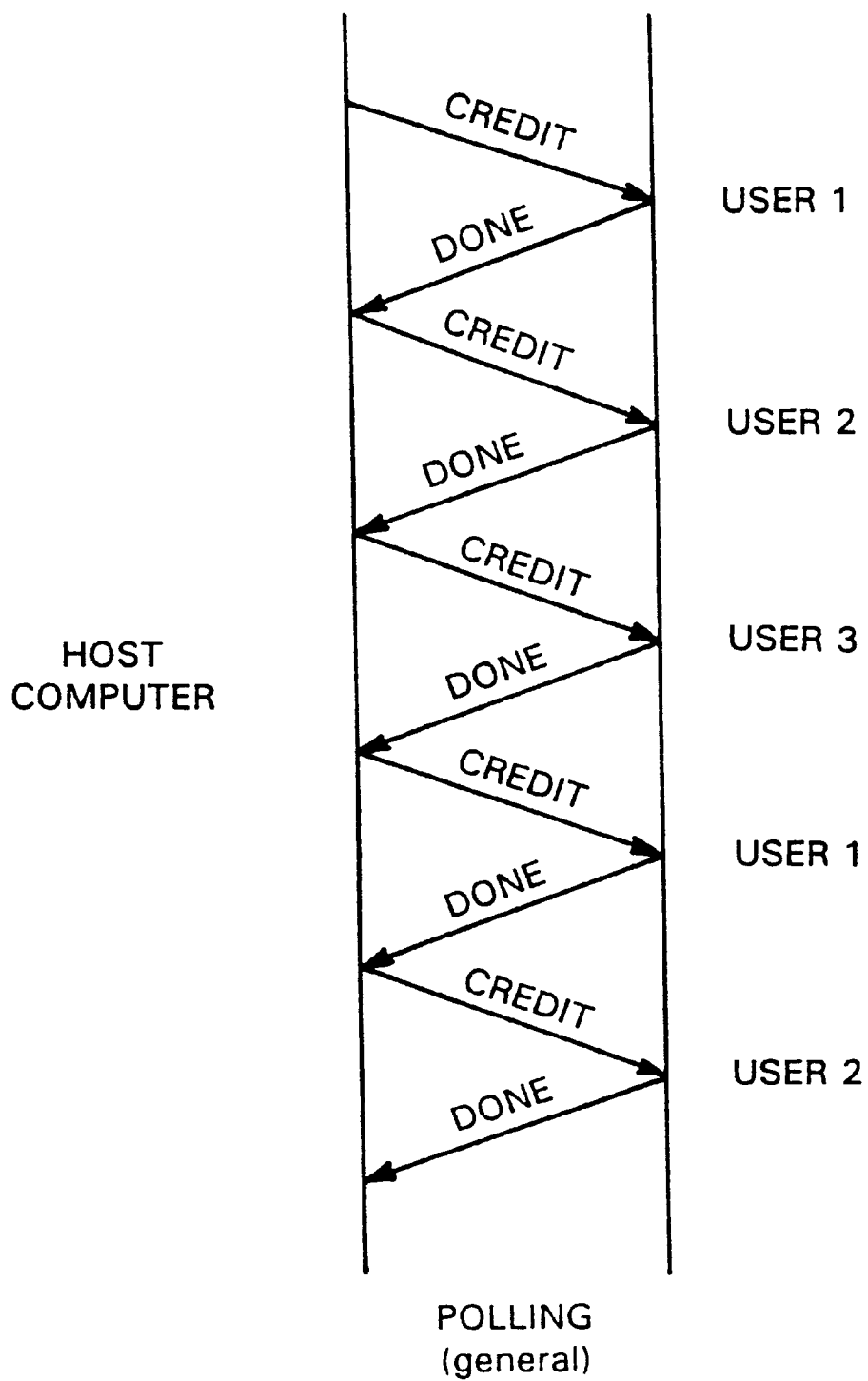
FIG. 6 shows downstream polling (e.g., 'credit' messages) from the controller to each of three users, and the response thereto (e.g., 'done' messages) sent in a selected polling mode upstream channel currently assigned to all three users.

FIG. 6 shows downstream polling (e.g., 'credit' messages) from the controller to each of three users, and the responses (e.g., 'done' messages) therefrom. The polling messages are performed in the single downstream channel, while the response messages are sent in the currently assigned upstream channel, e.g., Group B or Group C channels.

Polling Mode Channels—Groups B & C

Conventional polling schemes concern themselves with the sharing of a single channel. Some of the more popular schemes are:

Exhaustive Polling: When a modem is polled, all waiting packets, as well as any packet that arrives while the service is proceeding, are transmitted.

Gated Polling: When a modem is polled, only packets present at the time of the poll are transmitted. Those that arrive during service are transmitted during the next polling cycle.

Limited-n Polling: When a modem is polled, up to n waiting packets may be transmitted.

For the single channel case, exhaustive and gated polling schemes have the drawback that a single Type I user with a large amount of data can increase the delay for all Type II users. However, the serviced Type-I user with the large amount of data does experience good throughput and low delay.

The preferred polling algorithm should combine the benefits of high throughput for Type I users such as is provided by exhaustive polling, together with low delay for Type II users such as is provided by Limited-1 polling. Thus, the channels serving Type II users would utilize a limited type Polling, while the channels serving Type I users would utilize exhaustive type polling. However, a limited-n polling scheme, such as a limited-1 polling scheme, provides good service for Type II users, but at the cost of throttling back bursty Type I users. This problem is intractable for the single channel case. However, given a plurality of channels as in the present invention, it is found that good service can be provided to both Type I and Type II users by intelligently segregating busy Type I and Type II users into different channels.

In the exemplary embodiment, the controller is capable of polling the users assigned to upstream polling mode channels, e.g., Groups B and C, and the user receiving the poll transmits a packet of data. According to the particular polling protocol used, if the total number of users in any polling mode channel is less than or equal to a predetermined number, then that upstream polling mode channel is dedicated to those users and operates in a contention mode. On the other hand, if the total number of users becomes more than the predetermined number, then that polling mode channel resumes utilization of a polling protocol, and thus the controller resumes polling the users in the polling mode channels. The available polling mode channels are classified as either a Group B or Group C type polling mode channel.

Switching Upstream Communications Between Group A, B and C Channels

When an idle user first becomes busy and has one or more packets of data to transmit, it is moved from a Group A contention mode channel to a Group B polling mode channel. If a user is assigned to a Group B polling mode channel for more than a predetermined amount of time, e.g., one minute, without transmitting any data, then it is at that time reassigned to utilize a Group A contention mode upstream channel for its next transmission. When a user in Group A first becomes active and is otherwise qualified to move to a Group B polling mode channel, it is left in that Group A contention mode channel and utilizes a polling protocol therein if the total number of users in the Group B polling mode channel is greater than twice $N_B$, where $$N_B = \frac{2(NumberOfChannelsInGroupB)(LAT_B)}{CreditDoneCycleTime},$$

and $LAT_B$ is the target average latency in the Group B polling mode channel. The user is reassigned to a Group B polling mode channel when space becomes available and if the user has any remaining packets of data to transmit. If more than a predetermined number of packets of data (e.g., three or more) are queued for transmission to the controller from a user assigned to a Group B polling mode channel at the time of receiving a poll from the controller in the Group A contention mode channel (i.e., a burst is detected), then the user is first moved to a Group C polling mode channel for transmission of the burst of packets.

When a user in a Group B polling mode channel is otherwise qualified for reassignment to a Group C polling mode channel, but F is equal to or greater than a predetermined number, e.g., two, where $$F + \frac{NumberOfModemsInGroupC}{NumberOfChannelsInGroupC},$$

then that user is left in that Group B polling mode channel until space becomes available in a Group C (and the user has any remaining packets of data to transmit). If F is less than the predetermined number, then the user is added to a Group C polling mode channel.

A user assigned to a Group C polling mode channel is reassigned to a Group B polling mode channel if: (1) the user has not sent data in a last predetermined period of time, e.g., 100 milliseconds; or (2) the user has spent more than a predetermined amount of time, e.g., ten seconds, assigned to a Group C polling mode channel.

These rules are exemplary only and are not to be interpreted as limiting the scope of the invention. These general rules are implemented in the overall protocol as shown in FIGS. 7 to 8D.

Figure 7:
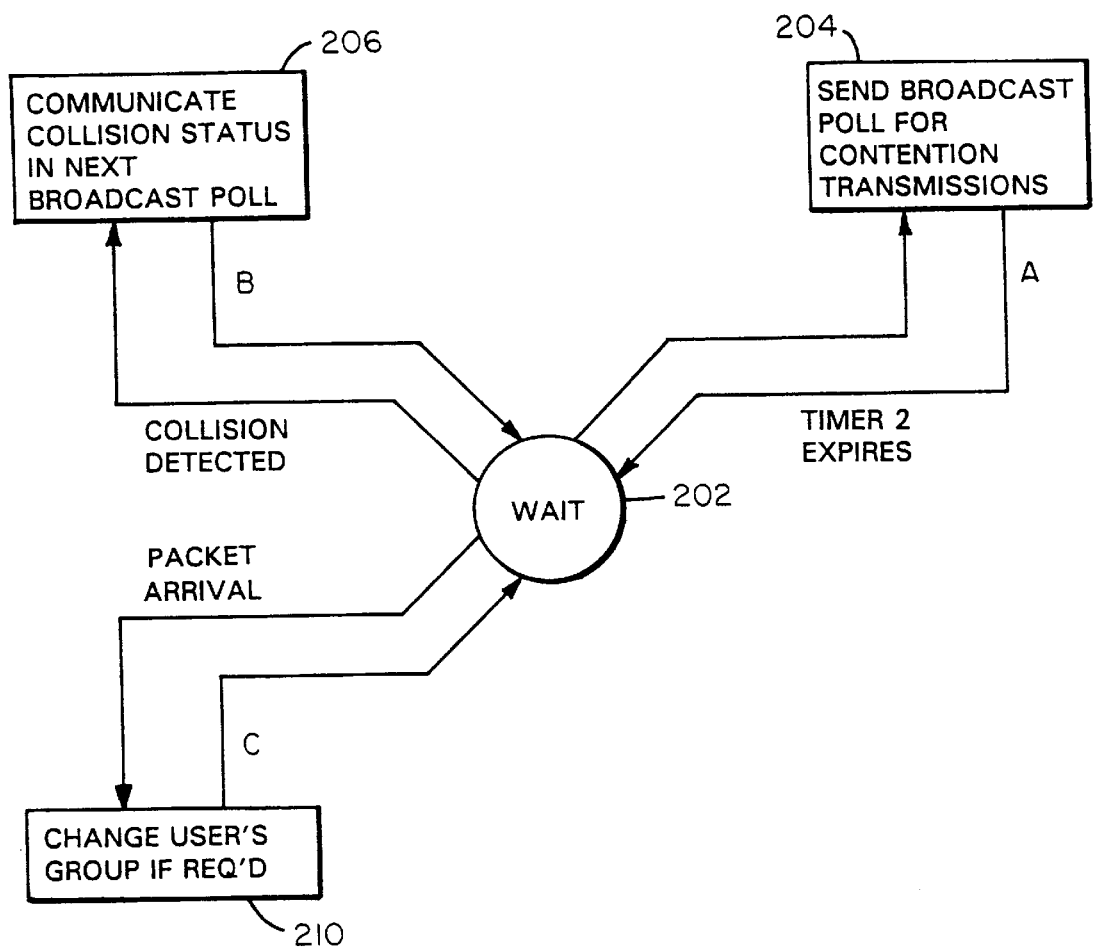
FIG. 7 is a diagram of a controller state machine.
Figure 8:
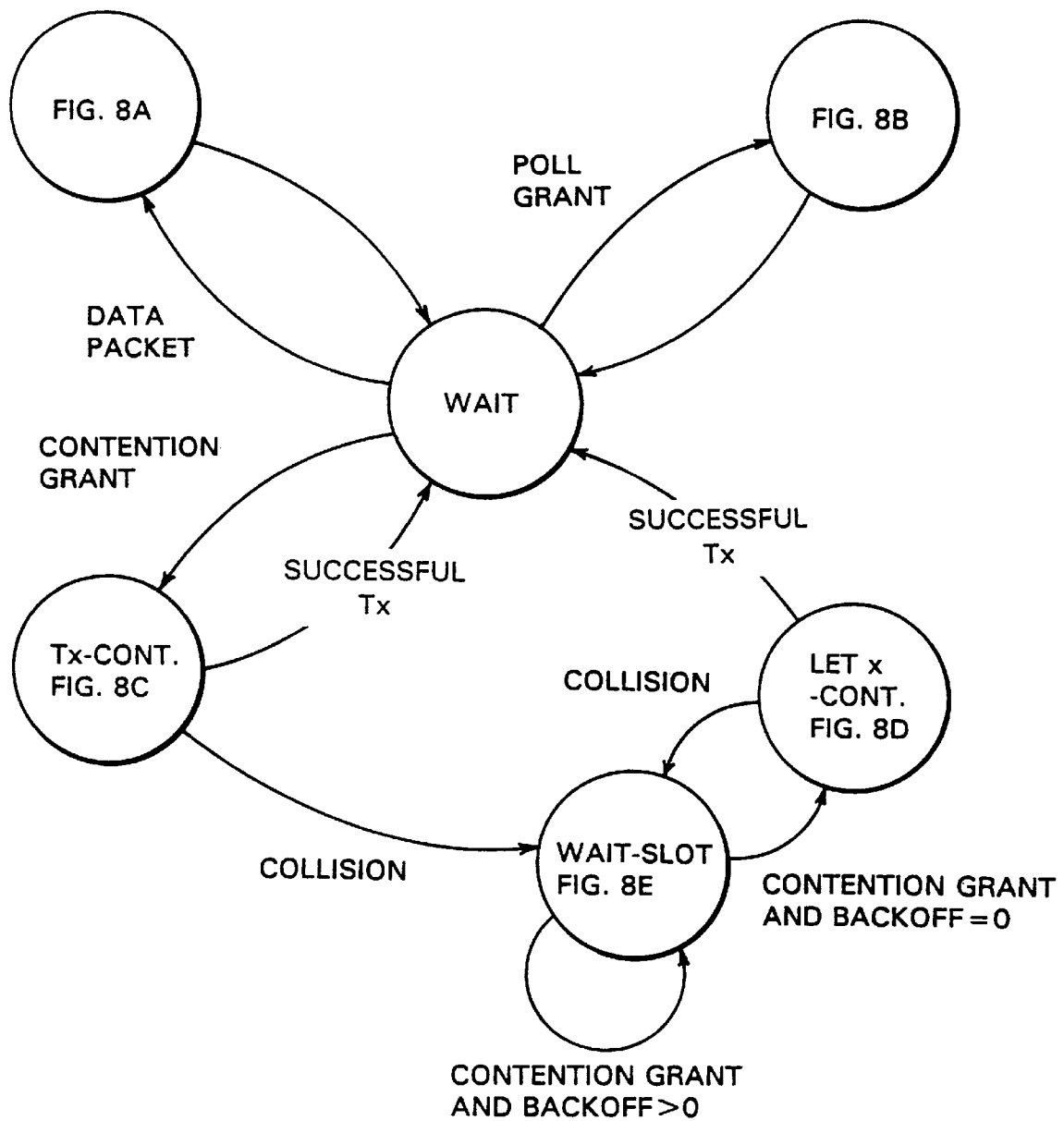
FIG. 8 is a diagram of a user state machine.

FIG. 7 shows the state machine of the controller 100. Upon start-up of the controller software, the controller state machine enters an endless loop or wait state 202. From the wait state 202, the controller 100 enters one of three alternate states 204, 206, and 210.

Figure 7A:
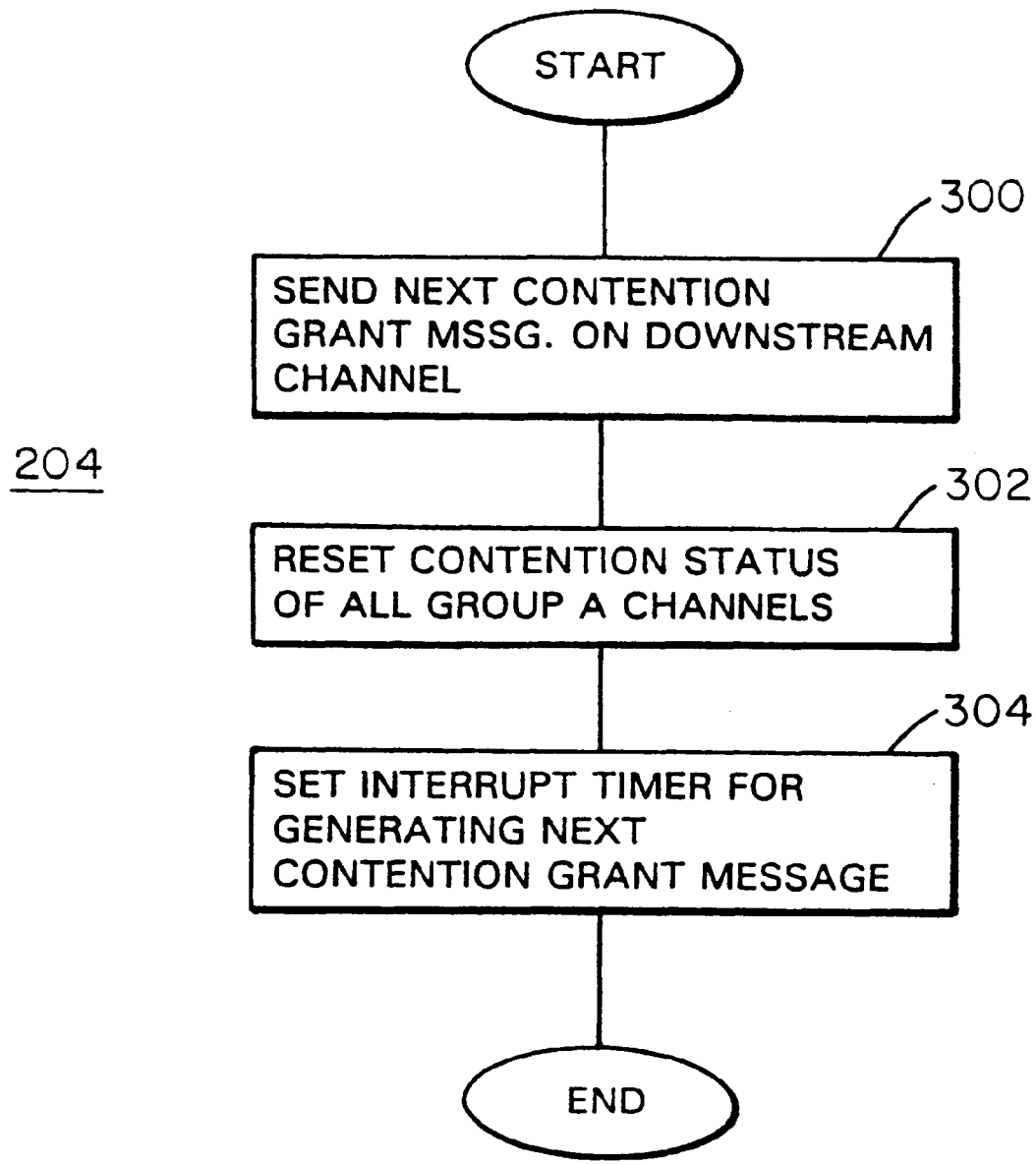

The first alternate state is entered on a periodic basis upon the expiration of a first interrupt timer, TIMER 2, to allow the users to transmit on a contention channel Group A. In the exemplary embodiment, the users choose from among the Group A channels at random. Upon expiration of TIMER 2, the controller 100 transmits a broadcast poll in step 204 enabling a contention-based transmission from all users currently assigned to a contention mode upstream channel, i.e., Group A. The process flow of step 204 is shown in more detail in FIG. 7A.

In particular, the controller 100 broadcasts a contention grant message to the users on the downstream channel in step 300. Afterwards, the contention status of all Group A channels is reset in step 302, and interrupt timer TIMER 2 is set for a desirable period of time for generating the next contention grant message in step 304.

Figure 7B:
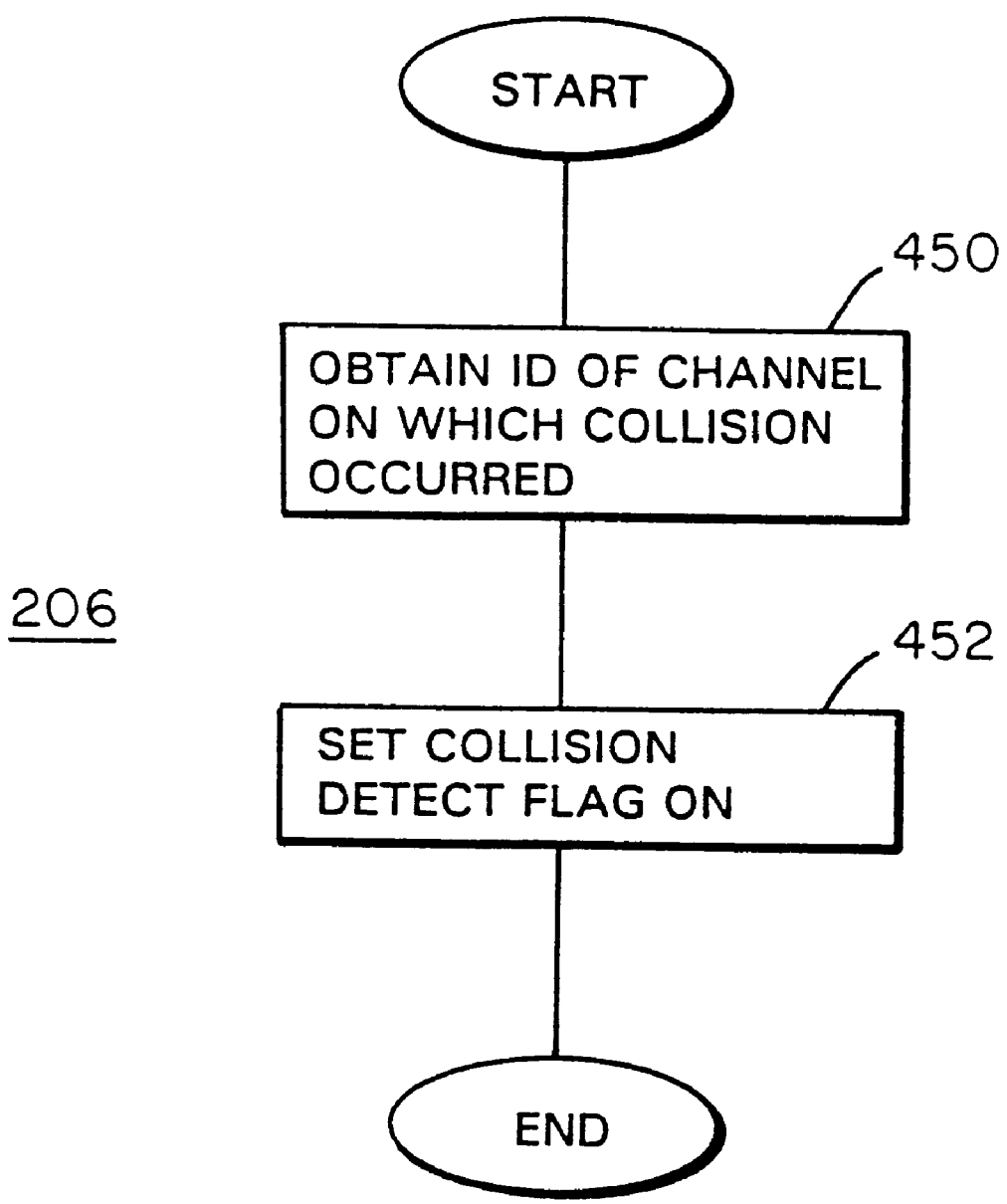

The second alternate state 206 is entered into upon notice of the detection of a collision. The processes of step 206 are shown in FIG. 7B.

In step 206, after a collision is detected, the ID of the channel on which the collision occurred is obtained in step 450, and a collision detect flag is set in step 452.

Figure 7C:
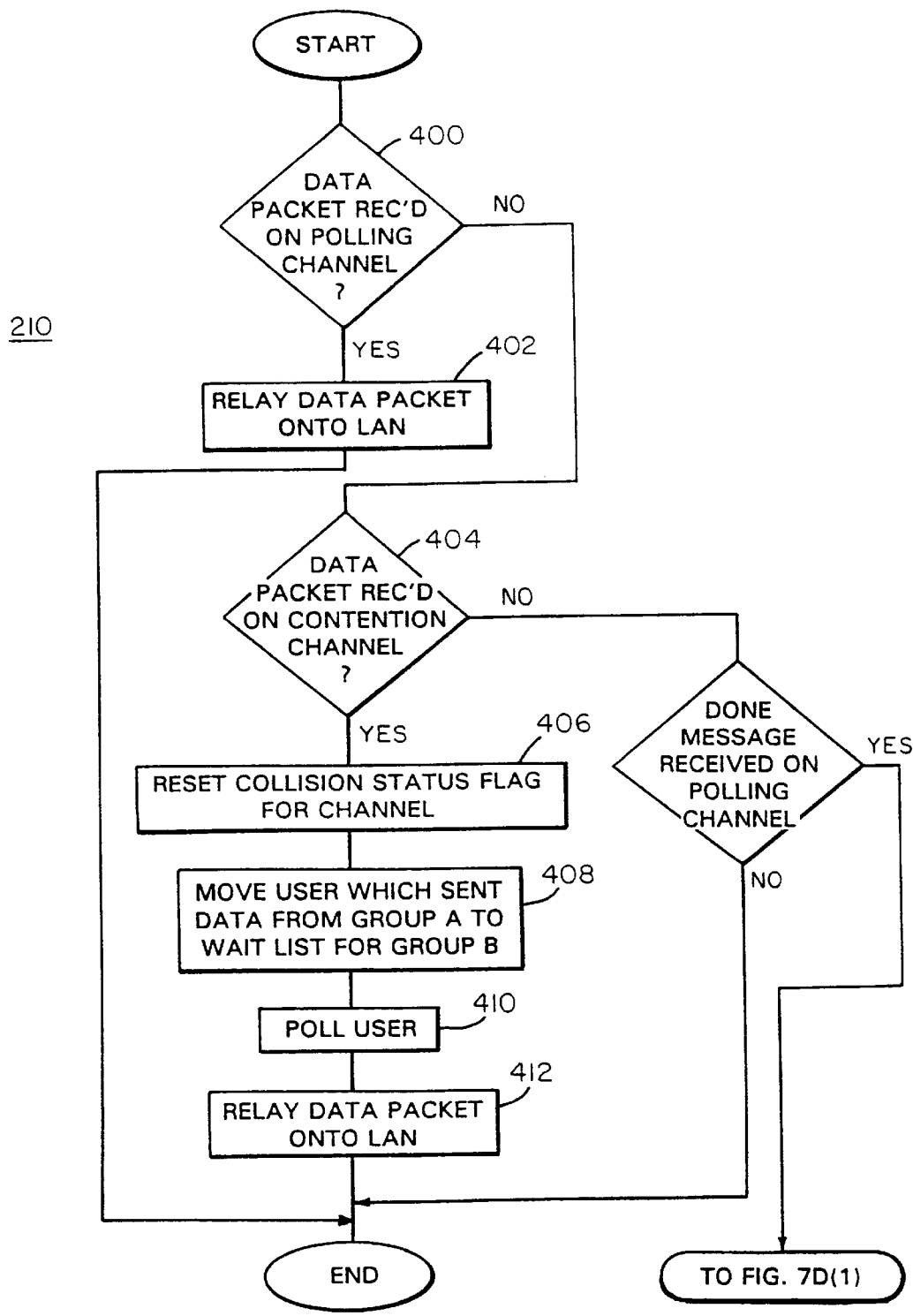

The third alternate state is entered upon the arrival of a data packet is shown in step 210 and FIG. 7C. In step 400, the controller determines if the data packet was received on a polling channel (i.e., Groups A or B). If not, processing continues. However, the data packet is forwarded to a local area network (LAN) or other network if the data packet was received on a polling channel in step 402. Similarly, the controller 100 determines if the data packet was instead received on a contention channel (i.e., Group A). If not, then the procedures of step 210 are completed. However, if the data packet was received on a Group A channel, then a collision status flag for the Group A contention channel is cleared in step 406, the user is re-assigned to a Group B channel for the transmission in step 408, and that user is then polled on a polling channel in step 410. In the exemplary embodiment, the controller 100 then forwards the data packet onto a LAN in step 412.

FIGS. 7D(1) to 7D(3) show the procedures carried out in step 208. FIG. 7D(1) relates particularly to processes with respect to users in Group B, FIG. 7D(2) relates particularly to processes with respect to users in Group C, and FIG. 7D(3) relates to users in both Groups B and C.

In step 500 of FIG. 7D(1), the controller 100 determines if the user to whom the dedicated poll is being sent is currently assigned to transmit upstream on a Group B channel. If not, the processes of FIG. 7D(1) are bypassed. If so, then the controller 100 determines if the user is to transmit data in response to the poll from the controller 100 in step 502.

In step 502, the controller 100 determines if the user transmitted data during the current poll. If so, step 504 determines if the number of packets exceeds a predetermined threshold, and if space is available in Group C. If the result of step 504 is positive, the user is placed in a wait list for Group C in step 508. If not, the user is placed in a wait list for Group B in step 506. If the user did not transmit data during the current poll as determined in step 502, step 510 determines whether or not the user has been inactive for more than a predetermined timeout period TIMEOUT2. If the timeout period TIMEOUT2 has been exceeded, step 514 places the user in Group A, and step 516 sends a message to the user from the controller to change to contention mode. If the user is relatively active and has not exceeded the timeout period TIMEOUT2 as determined in step 510, then the user is placed in a wait list for Group B in step 512. The processes shown in FIG. 7D(1) are continued in FIG. 7D(3) at point 518.

FIG. 7D(2) relates to the processes for users in Group C. In step 600, if the user is in Group C, the processes shown in step 7D(2) are executed. If not, the controller continues on to the steps shown in FIG. 7D(3).

Step 602 determines if the user has been inactive for a period of time greater than a predetermined TIMEOUT1. If so, the controller determines whether the user is in a polled state in step 604, or in a dedicated state in step 608. If the user is in a polled state, the user is placed in a wait list for Group B in step 606. If the user is in a dedicated state as determined in step 608, then the user is placed in a polled state in step 610.

If, on the other hand, the user has not been inactive for a period of time greater than TIMEOUT1, then it is similarly determined if the user is in a polled state (step 612) or in a dedicated state (step 616). If the user is in a polled state as determined in step 612, then the user is placed in a wait list for Group C in step 614. If the user is in a dedicated state as determined in step 616, then the user is placed in a dedicated state in step 618 if the number of users in Group C is less than a predetermined threshold, i.e., a maximum number of dedicated users in Group C. Also, the user is placed in a polled state in step 620 if the number of users in Group C is greater than the predetermined threshold.

The process steps shown in FIGS. 7D(1) and 7D(2) both lead into the process steps shown in FIG. 7D(3). In step 700 shown in FIG. 7D(3), the user is removed from a polling state and put on a wait list for Group B or C. Then, in step 702, while the wait list for Group C is non-empty, steps 704 and 706 are performed. In step 704, the user at the top of the wait list for Group C is polled. In step 706, the user is placed in a dedicated mode if the number of users in Group C is less than the number of channels in Group C. In step 708, while the wait list for Group B is non-empty, the user at the top of the wait list for Group B is polled in step 710. The controller 100 then reaches the end 712 and re-enters wait state 202.

Figure 8A:
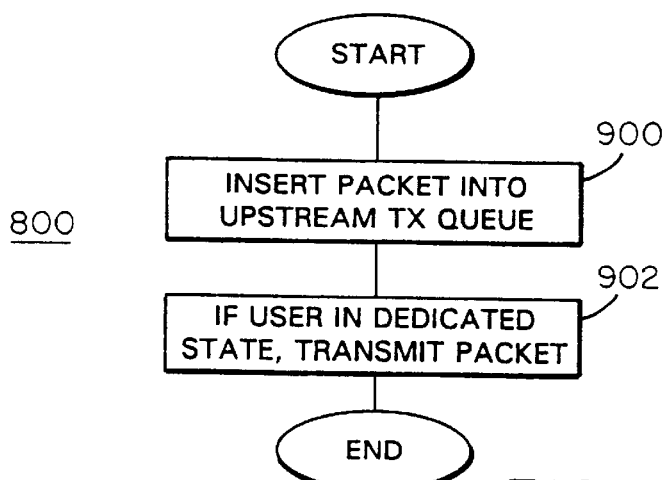
FIGS. 8A to 8E are flow chart showing procedures implemented at various states of the user state machine in the exemplary embodiment of the present invention.

The user state machine is shown in FIG. 8. Upon start-up, the user passes through a start state and enters an endless loop or wait state 810. Upon the arrival of a data packet, step 800 shown in more detail in FIG. 8A is entered. Upon the reception of a poll, steps 802 and 804 are performed, as shown in more detail in FIGS. 8B and 8C, respectively. Lastly, upon completion of an upstream transmission, step 806 shown in more detail in FIG. 8D is performed.

Step 800, which is performed upon the arrival of a data packet, is shown in FIG. 8A. In sub-step 900, a packet is inserted into the upstream transmit queue, and in sub-step 902, the packet is transmitted if the user is in a dedicated state.

Figure 8B:
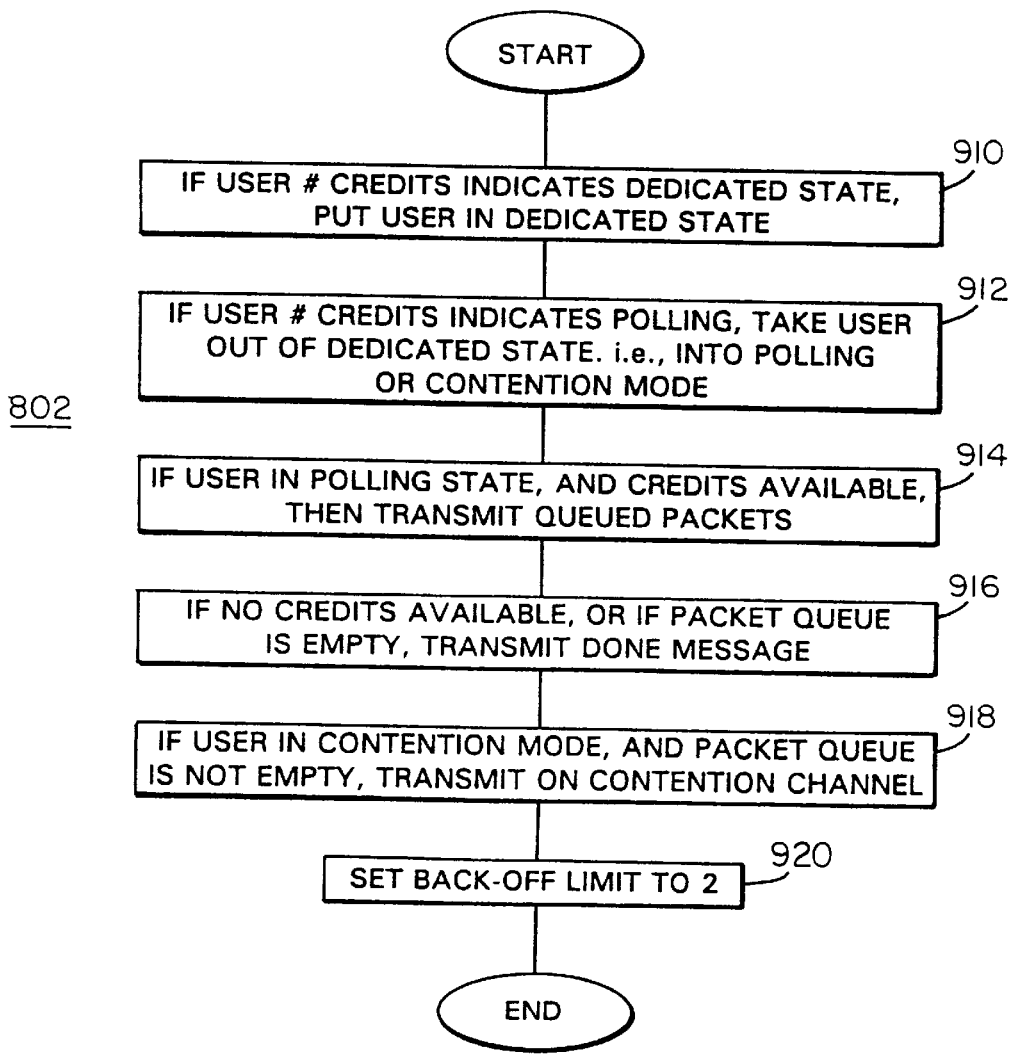
Figure 8C:
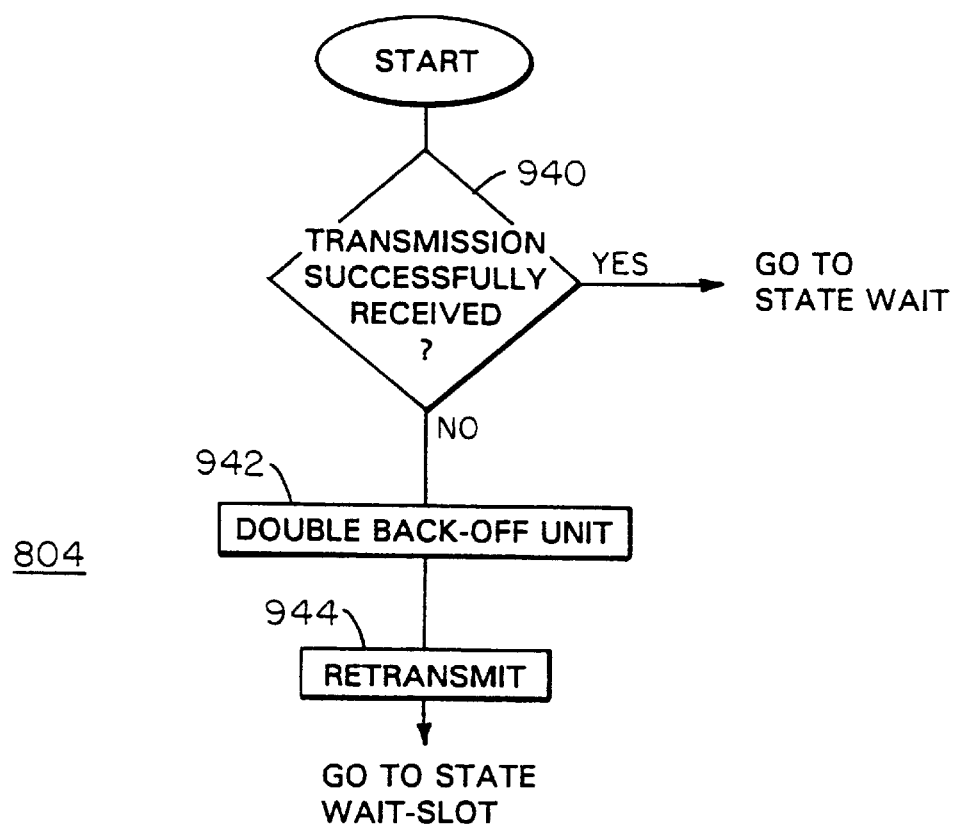
Figure 8D:
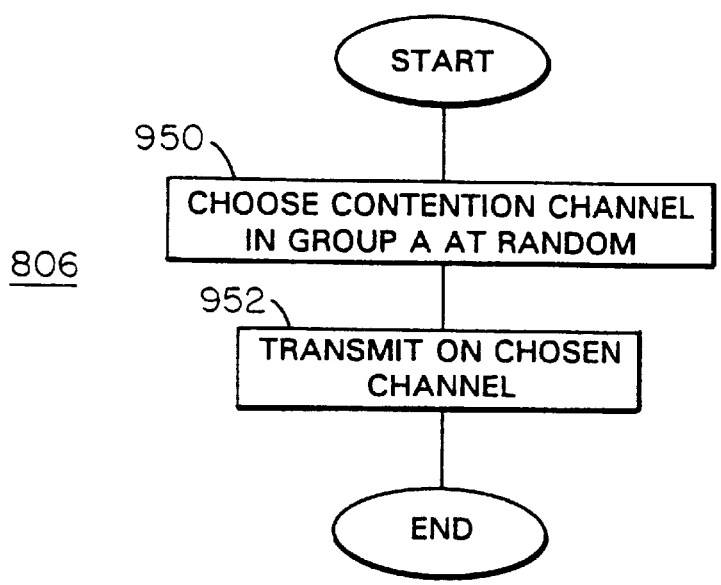
Figure 8E:
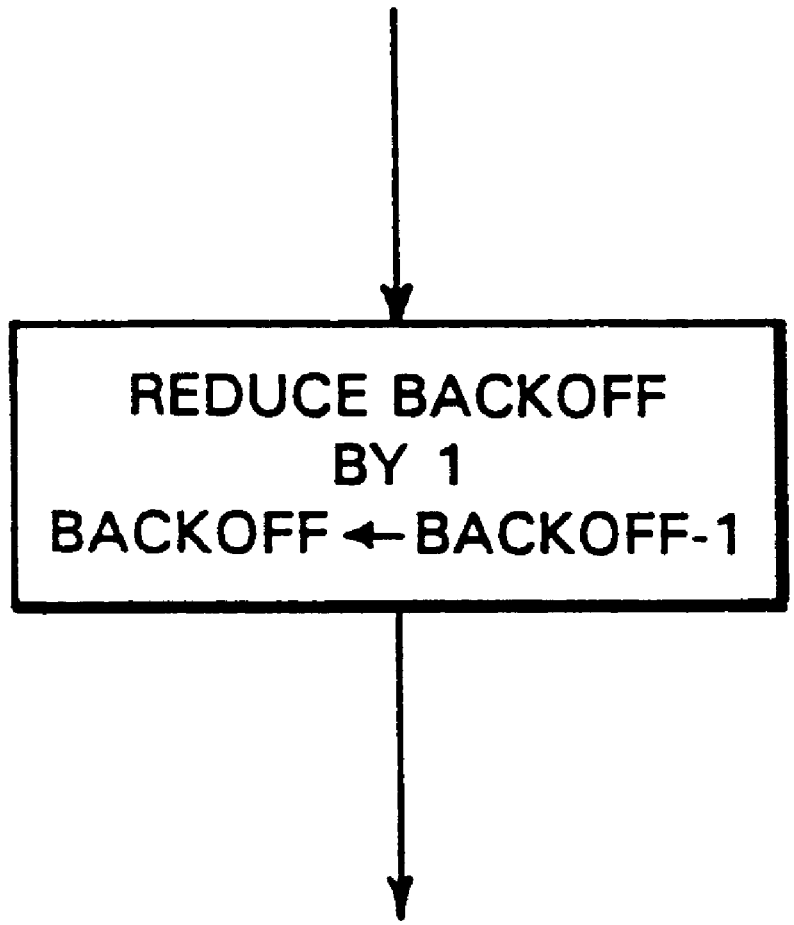

In step 802, shown in more detail in FIG. 8B, the user is placed in a dedicated state in sub-step 910 if the user's number of credits indicates a dedicated state for that user. If the user's number of credits indicates polling in sub-step 912, then the user is taken out of the dedicated state, and placed into either a polling or contention mode. In sub-step 914, queued packets are transmitted if the user is in a polling state and credits are available to that user. In sub-step 916, if no credits are available, or if the packet queue is empty, then a done message is transmitted. In sub-step 918, if the user is in contention mode (i.e., in Group A), and if the packet queue is not empty, then the user transmits on a contention channel chosen at random. The contention backoff limit is set to a default value, e.g., two, in sub-step 920.

In step 804, the user determines if the transmission was successfully received in sub-step 940. If so, step 804 is completed. If not, then the backoff limit is increased, e.g., doubled, in sub-step 942, and the user re-transmits in sub-step 944.

Step 806, which is entered upon completion of an upstream transmission from the user to the controller 100, is shown in FIG. 8D. In sub-step 950, a contention channel out of those available in Group A is chosen at random. The user then transmits on the chosen Group A channel in sub-step 952.

The following general comments and notes apply to the exemplary embodiment.

The number of packets queued at the modem is computed, then acknowledgment suppression is accomplished. For example, if there are three packets which are suppressed into one packet, and two additional data packets, then the number of queued packets is reported to the controller 100 as five, resulting in three packets being transmitted.

Choice of Appropriate Parameters

A cable modem system is used as an exemplary embodiment. The choice of parameters in the exemplary embodiment was based on the following assumptions:

(1) A total of 500 users attached to an upstream path, 10% of which are active at any one time and another 10% of which are inactive.

(2) A Credit-Done cycle time of 25 ms.

(3) A target of 150 ms for maximum polling latency and 75 ms for average polling latency in Group B.

(4) A target maximum downstream throughput of 750 Kbytes/s and a minimum downstream throughput of 600 Kbytes/s in Group C, for a modem in the middle of a very large burst.

(5) A target downstream throughput of 350 Kbytes/s in Group B, for a modem in the middle of a very large burst.

The last throughput requirement is included in this list for the following reason: It may happen that a bursting modem may not be able to move into Group C. In this case, it will be forced to carry out its burst in Group B. Even in this situation, it should be able to sustain a throughput of at least 350 Kbytes/s. Once it has been moved to the burst channel, its throughput can increase, e.g., up to 750 Kbytes/s.

Given a maximum polling latency of 150 ms in Group B, the maximum RTD from the server at the headend and back is about 175 ms. It is concluded that a bursting user in Group B can sustain a throughput of 350 Kbytes/s with 150 ms maximum latency.

For Group C, the minimum RTD is 25 ms (for the case of a dedicated channel) and the maximum RTD is 75 ms. It is concluded that the corresponding throughputs that can be achieved in a 10 second interval are 750 Kbytes/s and 600 Kbytes/s.

It was determined that, for the exemplary embodiment, K=1 (one channel in Group A) is sufficient to provide adequate performance for up to 500 cable modems communicating with a controller.

The value of I depends on two factors: the total number of simultaneously active subscribers M, and the target latency for Type II applications.

TABLE I

| I | Avg. Type II Packet Latency | Max. Type II Packet Latency |
|---|---|---|
| M/5 | 75 ms | 150 ms |
| M/10 | 150 ms | 300 ms |
| M/15 | 225 ms | 450 ms |
| M/20 | 300 ms | 600 ms |

The choice of the required number of channels J in Group C is not as straightforward as choosing values K and I. Based on simulations, the recommended value for J is as follows:

TABLE II

| M | J |
|---|---|
| 1 to 50 | 3 |
| 51 to 100 | 4 |
| 101 to 150 | 5 |
| 151 to 200 | 6 |
| 201 to 250 | 7 |
| 251 to 300 | 8 |
| 301 to 350 | 9 |
| 351 to 400 | 10 |

The main constraint on the value of J is that it be large enough to accommodate the simultaneously bursting users. If it is not large enough, then some of the bursting users will be forced to wait in Group B, which will decrease their throughput. Downstream file transfers typically require less than 1 second to complete once they gain access to Group C. Assuming an average user transfers a file every 20 seconds, the number of simultaneously bursting users B is given according to Little's Law by:

$$B = \frac{M}{20}$$

Substituting for M, we obtain values for B that are in the ballpark for the recommended values for J as shown in Table I.

Note that the recommended values for K, I and J are purely for exemplary purposes only, and are not to be construed as limiting the scope of the claims of the invention.

The activity threshold T_ON is defined as the minimum number of packets queued at the user at the time at which the user is polled, causing the movement of the user to Group C.

The parameters for Group C are chosen such that it is preferred that only Type I applications make use of the channels in Group C. A larger value of T_ON is preferred to prevent Type II applications from being admitted into Group C. It was determined that T_ON=2 caused a high amount of incursions into Group C, while T_ON=4 provided almost no incursions. Larger values of T_ON provides some disadvantages. For instance, the TCP slow-start algorithm starts with a window size of 1 segment, and gradually builds up.

Therefore, it may take several round trip delays before it generates enough packets in a single burst to trigger T_ON. Table III below shows the preferred minimum size of a Type I transaction for admission into Group C. Table III takes the ACK every other segment rule that most TCP receivers use.

TABLE III

| T_ON | Min. # Packets | Min. Trans. Size (512 Byte Packets) |
|---|---|---|
| 1 | 1 | 512 Bytes |
| 2 | 9 | 4608 Bytes |
| 3 | 15 | 7680 Bytes |
| 4 | 24 | 12,288 Bytes |

From Table III we see that the minimum transaction size rises quite rapidly with the value of T_ON such that as T_ON increases, so does the situation that smaller transactions will not be able to take advantage of Group C. Moreover, an increased value of T_ON results in Type I transactions which take longer to complete.

A balanced approach to the value for T_ON is a choice of T_ON=3 in the exemplary embodiment.

The parameter TIMEOUT1 is defined as the period of time for which a user holds a dedicated channel in Group C without transmitting data, after which it gives up the channel and is reassigned to Group B.

The TIMEOUT1 parameter is used to remove inactive users from Group C, for the case in which Group C is lightly loaded, so that each user gets its own dedicated channel. The value of TIMEOUT1 should be small enough such that unwanted Type II applications are quickly detected and removed from Group C. Moreover, TIMEOUT1 should be large enough such that a Type I application is not inadvertently interrupted in the middle of its burst. It has been observed that successive packets in a burst are typically separated by about 1 ms, and that successive packets in a burst are typically separated by about 10 ms. Hence, in view of these considerations, the value TIMEOUT1=100 ms was chosen.

The parameter TIMEOUT2 is the amount of time a user in Group B may be idle or inactive before it is moved or reassigned to Group A.

While the invention has been described with reference to the exemplary preferred embodiments thereof, those skilled in the art will be able to make the various modifications to the described embodiments of the invention without departing from the true spirit and scope of the invention. For instance, the invention is applicable not only to the transmission of data over TV channels, but to the transmission of packet data over any means, e.g., the Internet, RF, microwave, satellite, etc. Moreover, the invention is equally applicable to the transmission of data over TV channels in utilizing any of the various TV standards utilized around the world.

We claim:

1. A two way network communication system including a controller and plural client devices, said system comprising:
   a downstream medium over which said client devices receive data;
   an upstream medium including at least three upstream channels for conveying data from said client devices
   one of said upstream channels operating in a contention mode, another of said upstream channels operating in a low-latency and yet another of said upstream channels operating in a burst mode, a relatively higher data throughput polling mode, wherein at least one of said channels is alterable between a polling mode and a contention mode;
   said controller being operative to assign to a client device any one of said at least upstream channels based on a bandwidth characteristic of payload data transferred by said client device.

2. The system according to claim 1, wherein:
   said controller monitors data transmissions of the client device over an upstream channel and dynamically effects assignment of the upstream channel based on a per data packet basis.

3. The system according to claim 1, further comprising:
   a plurality of sets of said at least three upstream channels; and
   said controller effects assignment of upstream channels from among said plurality of sets.

4. The system according to claim 1, wherein:
   said characteristic is a frequency of payload data transmissions from the client device.

5. The system according to claim 1, wherein:
said characteristic is a length of payload data queued for transmission.

6. The system as recited in claim 1, wherein at least one of said polling modes channels is dedicated to a group of client devices.

7. The system as recited in claim 1, wherein at least one of said channels is alterable between a polling mode and a contention mode as a function of one of user loading.

8. The system as recited in claim 1, wherein said upstream and downstream medium are common.

9. The system as recited in claim 1, wherein said upstream medium and downstream medium are different.

10. The system as recited in claim 1, wherein said system provides asymmetric communication over said upstream and downstream media.

11. A method of utilizing a broadband channel for data communications between a controller and a plurality of user, said method comprising:
sub-dividing said broadband channel into at least three separate data channels for upstream communications;
assigning a first group of currently inactive ones of said plurality of users to a first channel of said at least three separate data channels for upstream communications;
assigning a second group of active ones of said plurality of users to a second channel of said at least three separate data channels, for upstream communications;
assigning a third group of relatively more active ones of said plurality of users to a third channel of said at least three separate data channels for upstream communications;
wherein said plurality of users are reassigned by said controller between one of the first, second and third channels for upstream communications based on a bandwidth characteristic of payload data transmitted by respective ones of said plurality of users.

12. The method of utilizing a plurality of communication channels according to claim 11, wherein:
said plurality of users are reassigned between said second and third channels to separate active ones of said plurality of users with a short packet latency requirement from relatively more active ones of said plurality of users with a high packet throughput requirement.

13. The method of utilizing a plurality of communication channels according to claim 11, wherein:
said first channel is operated in a contention mode; and
said second channel and said third channel are operated in different respective polling modes.

14. The method of utilizing a plurality of communication channels according to claim 13, wherein:
said second channel is operated in a limited polling scheme protocol; and
said third channel is operated in an approximately exhaustive polling scheme protocol.

15. The method of communicating according to claim 11, wherein:
said characteristic is a frequency of payload data transmissions from said user.

16. The method of communicating according to claim 11, wherein:
said characteristic is a length of said payload data packet queued for transmission.

17. An asymmetric data communication system comprising:
a controller;
a plurality of users;
a downstream channel for conveying information from said controller to said plurality of users; and
a plurality of upstream channels for conveying information from said plurality of users to a host, said plurality of users having accessibility to all or some of said plurality of upstream channels but being assigned to only one of said plurality of upstream channels for transmission at any one time;
a first of said plurality of upstream channels operating in a contention mode;
a second of said plurality of upstream channels operating in a more limited polling mode;
a third of said plurality of upstream channels operating in a burst mode, a relatively higher data throughput mode;
said plurality of users being assigned and reassigned between said first and second of said plurality of upstream channels based on a bandwidth characteristic of payload data transmitted by said respective plurality of users; and
said plurality of users being assigned and reassigned between said second and third of said plurality of upstream channels based on a different bandwidth characteristic of payload data transmitted by said respective plurality of users.

18. The asymmetric communication system according to claim 17, wherein:
said characteristic is a frequency of payload data transmissions from said user.

19. The asymmetric communication system according to claim 17, wherein:
said characteristic is a length of payload data queued for transmission.

20. In an asymmetric network communication system including a server, plural clients and asymmetric communication channels interposed between said server and client that include a downstream channel and plural upstream channels, the improvement comprising:
a controller that enables said clients to share said plural upstream channels wherein respective ones of said plural upstream channels operate under respective protocols including a contention protocol, a limited polling protocol and a more exhaustive polling protocol;
at least one of said clients including a first status indicator indicative of at least an inactive status and an active status thereof depending on a need to transfer data and an associated second status indicator indicative of bandwidth needs during active data tansfers of payload data by said at least one of said clients; and
said controller being responsive to said first indicator to assign a client to an upstream channel having said contention protocol in the absence of a data transfer request and responsive to said second indicator to dynamically assign said at least one client to said upstream channel having one of said limited and more exhaustive polling protocols according to the instantaneous bandwidth reguest or consumption of said client during active transfer of said payload data by said at least one client.

21. A media access control system for use in an asymmetric network communication system which includes a server, plural client devices and asymmetric channels interposed between said server and client devices, said asymmetric network including at least one downstream channel and plural upstream channels that operate under respective protocols including a contention protocol, a low bandwidth polling protocol and a high bandwidth polling protocol, said low bandwidth polling protocol being adapted to handle data transfers at relatively low average rates and said high bandwidth polling protocol being adapted to handle data transfers at relatively higher average rates, said control system comprising:

a demand indicator associated with at least one client device indicative of a status depending on a data transfer request by said client;

a consumption indicator indicative of data transfer needs of said client device during active data transfers of payload data by said client device; and a controller responsive to said demand indicator to assign said client to an upstream channel having a contention protocol in the absence of said data transfer request and responsive to said consumption indicator to dynamically assign said client device to said upstream channel having one of said high and low bandwidth polling protocols according to the payload data transfer needs of said client device for active transfers of payload data by said client device.

22. A two way networking communication system including a controller and plural client devices, said system comprising:

a shared downstream medium over which data is conveyed to said client devices, an upstream medium including at least three available upstream channels over which data is conveyed from said client devices;

one of said at least three upstream channels operating in a contention mode and two of said at least three upstream channels operating in respective different polling modes;

said controller being operative to assign to said client device any one of said at least three upstream channels based on a bandwidth characteristic of payload data transferred by said client device;

wherein one of said two polling mode upstream channels has a limited polling scheme; and the other of said two polling mode upstream channels has an approximately exhaustive polling burst mode.

23. A method of communicating between a controller and a plurality of client devices, comprising:

providing a downstream communication channel over a shared medium;

providing a plurality of upstream communication channels within said medium;

assigning currently inactive ones of said plurality of client devices to one of said plurality of upstream communication channels operating in a contention mode;

assigning currently active ones of said plurality of client devices to either of said at least two of said plurality of upstream communication channels operating in respective polling modes, one polling mode operating in a more limited mode, the second operating in a relatively higher data throughput mode active burst mode; and said assignment being based on a bandwidth characteristic of payload data transmitted by respective ones of said plurality of client devices.

24. The method of communicating according to claim 23, further comprising:

providing one of said two others of said plurality of upstream channels with a limited polling scheme; and providing the other of said two others of said plurality of upstream channels with an approximately exhaustive polling scheme.

25. The method of communicating according to claim 23, wherein:

said characteristic is a recurrence of payload data transmissions from said user.

26. The method of communicating according to claim 23, wherein:

said characteristic is a length of said payload data packet queued for transmission.

27. A method of communicating between the controller and a plurality of users, comprising:

providing a downstream communication channel;

providing a plurality of upstream communication channels;

assigning currently inactive ones of said plurality of users to one of said plurality of upstream communication channels operating in a contention mode;

assigning currently active ones of said plurality of users to either of at least two of said plurality of upstream communication channels operating in respective polling modes, said assignment being based on a bandwidth characteristic of payload data transmitted by respective ones of said plurality of users;

from the perspective of said users, providing one of said two others of said plurality of upstream channels with a low latency polling scheme; and providing the other of said two others of said plurality of upstream channels with polling scheme providing a relatively higher data throughput also from the perspective of said users.

28. A method of communicating between a controller and a plurality of users in a communication network, comprising:

providing a downstream communication channel;

providing a plurality of upstream channels operable in a burst mode, a more limited polling mode, or a contention mode, each mode having different user latency and/or throughput rates;

altering the mode of at least one of said plurality of upstream channels between said burst mode, more limited polling mode, and said contention mode as a function of user loading; and assigning respective ones of said plurality users to one of said plurality of upstream channels.

* * * * *